United States Patent
Elwell

(10) Patent No.: US 7,796,620 B2
(45) Date of Patent: Sep. 14, 2010

(54) METHOD, TERMINAL AND MEDIA-RELAY FOR ESTABLISHING A MULTI-MEDIA CONNECTION

(75) Inventor: John Elwell, Nottingham (GB)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 123 days.

(21) Appl. No.: 12/077,666

(22) Filed: Mar. 20, 2008

(65) Prior Publication Data

US 2008/0232381 A1 Sep. 25, 2008

(30) Foreign Application Priority Data

Mar. 22, 2007 (EP) .................................. 07005931

(51) Int. Cl.
*H04L 12/28* (2006.01)
(52) U.S. Cl. ...................................... 370/401; 370/466
(58) Field of Classification Search ......... 370/352–356, 370/466, 467
See application file for complete search history.

(56) References Cited

U.S. PATENT DOCUMENTS

| 7,272,148 B2 * | 9/2007 | Zhang et al. ................. 370/401 |
| 7,436,814 B2 * | 10/2008 | Bell ........................... 370/351 |
| 2005/0185672 A1 | 8/2005 | Endo |
| 2006/0209794 A1 * | 9/2006 | Bae et al. .................... 370/352 |
| 2007/0019619 A1 * | 1/2007 | Foster et al. ................. 370/352 |
| 2007/0076729 A1 * | 4/2007 | Takeda ........................ 370/401 |

OTHER PUBLICATIONS

Rosenberg et al, STUN-Simple Traversal of User Datagram Protocol (UDP) Through Network Address Translators (NATs), RFC 3489, 47 pages, Mar. 2003.*

Camarillo et al., IPv6 Transition in the Session Initiation Protocol (SIP), draft-ietf-sipping-v6-transition-04, SIPPING Working Group, Internet-Draft, The Internet Society, Sep. 8, 2006, pp. 1-16, XP 15046987.

Rosenberg et al., "SIP: Session Initiation Protocol", The Internet Engineering Task Force, Network Working Group, Request for Comments: 3261, http://www.ietf.org/rfc/rfc3261.txt, Jun. 2002, pp. 1-225.

"Mmusic Status Pages", Multiparty Multimedia Session Control (Active WG), draft-ietf-mmusic-ice, Status: RFC Ed Queue, http://tools.ietf.orq/wg/mmusic/draft-ietf-mmusic-ice/, retrieved from Internet Jan. 31, 2008, pp. 1-6.

Handley et al., "SSDP: Session Description Protocol", Network Working Group, Request for Comments: 4566, http://www.ietf.org/rfc/rfc4566.txt, Jul. 2006, pp. 1-41.

Rosenberg et al., "Obtaining Relay Addresses from Simple Traversal Underneath NAT (STUN)", draft-ietf-behave-turn-03, Behave Internet-Draft, The Internet Engineering Task Force, Mar. 4, 2007, pp. 1-39.

Camarilo et al., "Extension to the Simple Traversal Underneath NAT (STUN) Relay Usage for IPv4/IPv6 Transition", draft-ietf-behave-turn-ipv6-01.txt, Behave Internet Draft, The Internet Engineering Task Force, Nov. 20, 2006, pp. 1-8.

* cited by examiner

*Primary Examiner*—Frank Duong
(74) *Attorney, Agent, or Firm*—Buchanan Ingersoll & Rooney PC

(57) ABSTRACT

In one aspect, a multi-media connection is established in a communications system based on packet oriented communication with at least a first station only supporting IPv6 datapackets, at least a second station only supporting IPv4 datapackets and at least a media relay station. A communication between the first station and the second station is at least partially established via the media relay station. A terminal and a media relay are also provided.

8 Claims, 1 Drawing Sheet

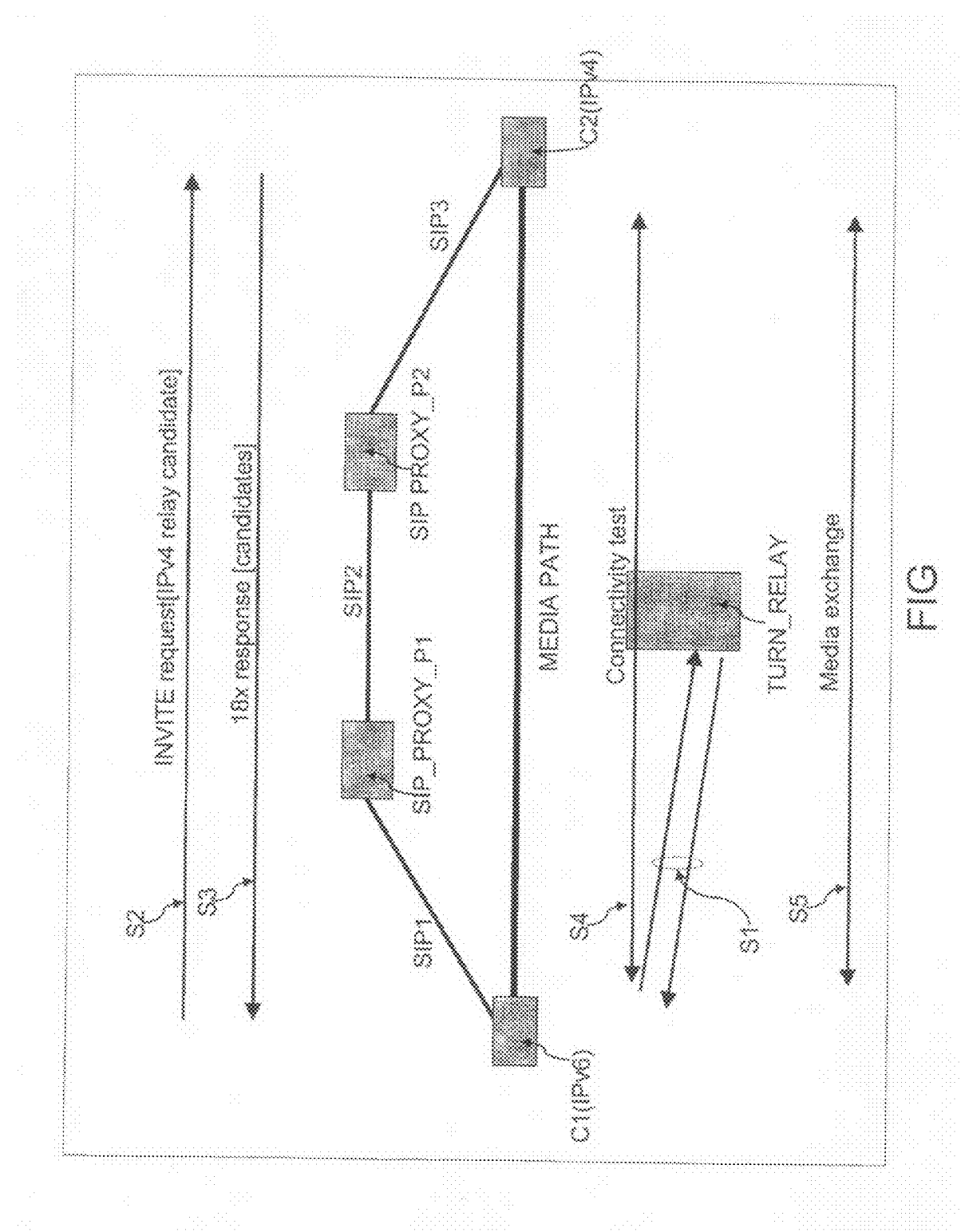

US 7,796,620 B2

METHOD, TERMINAL AND MEDIA-RELAY FOR ESTABLISHING A MULTI-MEDIA CONNECTION

CROSS REFERENCE TO RELATED APPLICATIONS

This application claims priority of European Patent Office application No. 07005931.6 EP filed Mar. 22, 2007, which is incorporated by reference herein in its entirety.

FIELD OF INVENTION

The invention relates to a method for establishing a multi-media connection, a terminal for establishing a multi-media connection and a media-relay for establishing a multi-media connection.

BACKGROUND OF INVENTION

Communications networks are well known in the art. Usually, these networks communicate using packet based connections. The communication generally is performed according to protocols. One of the most important protocols known for such purpose is the Internet Protocol (IP). For about 20 years Internet Protocol version 4 (IPv4) has been in use. In the year 1999 the Internet Engineering Task Force (IETF) introduced Internet Protocol version 6 (IPv6) and it coexists with IPv4, which lead to heterogeneous networks having stations (endpoints) supporting solely IPv6 and stations supporting solely IPv4.

SUMMARY OF INVENTION

The underlying problem of the invention is to enable communication between endpoints supporting different IP versions.

The problem is solved via the method, the terminal and the media-relay according the independent claims.

The Method according to the invention for establishing a multi-media connection in a communications system based on packet oriented communication with at least a first station only supporting IPv6 data-packets, at least a second station only supporting IPv4 data-packets and at least a media relay station, comprises the step whereby a communication between the first station and the second station is at least partially established by means of the media relay station.

According to a first embodiment of the invention the Method according to the invention is beneficially developed in such a manner that the media station translates IPv4 data-packets into IPv6 data-packets and vice versa.

According to a further embodiment the method according to the invention is beneficially developed in such a manner that the media station functions as a TURN relay station.

A beneficial development of the method according to the invention is realized with an embodiment comprising the steps when the first station or the second station is calling a) the calling station supplies its own IP address and port as its first candidate for communication, b) the calling station gathers at least one IP address and port from the TURN relay station as its second candidate, c) a called station supplies at least its own IP address and port as its candidate for communication, d) testing is performed in such a manner that for each pair of candidates comprising one of the candidates supplied by the calling station and one of the candidates supplied by the called station using the same IP protocol it is analyzed whether connectivity is achieved, e) if the test results show that connectivity is achieved between the calling station and the called station using the address and port supplied by the TURN relay station and submitted as candidate by the calling station and the address and port submitted as candidate by the called station, multi-media communication is established between the first station and the second station via the TURN relay station using the adopted addresses and ports.

According to a further embodiment of the invention the method is beneficially developed in such a manner that for gathering the second candidate if the calling station is a first station it receives from the TURN relay station an IPv4 address and port known by the TURN relay station and if the calling station is a second station it receives from the TURN relay station an IPv6 address and port known by the TURN relay station.

As a further embodiment the method according to the invention is beneficially developed in such a manner that the calling first station sends a SIP message, e.g. the "INVITE request" message, incorporating an offer according to SDP Protocol, including at least the first and second candidates to the called second station.

According to a further development the Method according to the invention realizes an embodiment, where the called second station returns a SIP message, e.g. the "18× response" message, incorporating an answer according to SDP Protocol, including at least a first candidate to the first calling station.

As a further embodiment the method according to the invention is beneficially developed in such a manner that the messages are transmitted via at least one station comprising the functionality of a proxy.

Another embodiment is given, if the method according to invention is beneficially developed in such a manner that testing is conducted by the first station and the second station.

The Terminal according to the invention for establishing a multi-media connection in a communications system based on packet oriented communication with at least a first station only supporting IPv6 data-packets, at least a second station only supporting IPv4 data-packets and at least a media relay station, comprises means for realization of one of the embodiments stated above.

The Media relay according to the invention for establishing a multi-media connection in a communications system based on packet oriented communication with at least a first station only supporting IPv6 data-packets, at least a second station only supporting IPv4 data-packets and at least a media relay station, comprises means for realization of one of the embodiments stated above.

As can be seen the embodiments of the invention realize an automatic insertion of a relay to translate between IPv4 and IPv6 in the path of media, for example audio, video and the like, as part of a single- or multi-media session established between two endpoints (stations) that, especially when signalling is performed in accordance with the Session Initiation Protocol "SIP" ("RFC 3261"), translation being necessary because one endpoint supports only IPv4 and the other endpoint supports only IPv6.

Such an insertion is generally done under endpoint control rather than requiring assistance of an intermediary in the signalling path and is done automatically when the use of such a relay is necessary and sufficient to achieve connectivity.

It is beneficially compatible with a technique known as Interactive Connectivity Establishment "ICE" ("draft-ietfmmusic-ice"), which is a method by which endpoints in SIP-established sessions can mutually determine IP addresses and ports on which they transmit and receive media. They may be known by different addresses and ports because of the presence of a Network Address Translator "NAT" devices between the endpoints. In such situations, an endpoint may need to advertise to the remote endpoint, via the session description, a different address/port, such that packets addressed to that different address/port will be forwarded, by the NAT, to the endpoint's local address/port. ICE allows endpoints to gather different address/port combinations by which they are known, treat these as candidate address/port combinations, and test to see which ones actually work in practice. Some will not work, because of the particular configuration of NATs, or because of firewalls (or firewall properties of NATs) that might intervene.

Connectivity tests operate directly between pairs of candidates on the two devices until a pair is found that works satisfactorily. Connectivity tests comprise sending a packet and looking out for a responding packet. When a test works, the endpoints then use that pair of address/port combinations to exchange a medium for the duration of the session.

It is recognized in an inventive way, that although NAT traversal was the prime motivation for the development of ICE, this technology can also be used for determining whether to use IPv4 or IPv6 as the network layer protocol. To achieve this, a dual stack device (supporting both IPv4 and IPv6) would identify both IPv4 candidates and IPv6 candidates. However, it does not solve the problem of how to introduce a relay for IPv4/IPv6 translation if the two endpoints support different protocols.

Generally, an intermediary in the signalling path has prior knowledge that the called endpoint supports an incompatible network protocol or deduces this from the fact that the called endpoint rejects the signalling request to establish a session. The intermediary must then establish two back-to-back sessions, between the calling endpoint and a relay that performs IPv4/IPv6 translation and between the relay and the called endpoint. The signalling intermediary is therefore required to understand and modify the session description, which normally should pass transparently between the two endpoints. A session description describes the media to be used during the call or session, the media formats to be used, and the IP addresses and ports on the endpoints between which the media is to be transmitted.

The invention has the advantage, that it overcomes some drawback, resulting from above stated: First, it overcomes the disadvantage that the architectural principle, fundamental to SIP, that session descriptions are transmitted end-to-end, is violated and second, it overcomes the disadvantage that the signalling intermediary would be required to understand full details of the session description, and might wrongly interpret or modify the session description if it fails to understand some recently-standardised or proprietary enhancements to the base standard—the Session Description Protocol (SDP, "RFC 4566"). Third, for security reasons the session description will often be cryptographically integrity protected to prevent unauthorised modification by a man-in-the-middle, and therefore even authorised modification of the session description by an intermediary that introduces a relay would break the integrity protection and look like an attack.

As can be seen, it is furthermore in an inventive way advantageously recognized that in some more difficult NAT configurations, no direct connectivity between endpoints is possible and that Connectivity can be achieved only by introducing a media relay, such that connectivity is possible between the first endpoint and the relay and between relay and the second endpoint.

It is further recognized that such a media-relay, which is known as a TURN (Traversal Using Relay NAT, "draft-ietf-behave-turn-03"), can be beneficially used for the invention, since ICE can use TURN relay addresses and ports as candidates, thereby allowing connectivity to be obtained through the relay if none of the direct connectivity candidate pairs work.

It is furthermore recognized that a TURN relay could be used as an IPv4-IPv6 relay according to the invention. To do this an IPv6 endpoint would request an IPv4 address/port on the far side of a TURN relay or vice versa ("draft-ietf-behave-turn-ipv6-01"). It was recognized that this alone is insufficient, because it does not provide an endpoint with the knowledge of when an IPv4-IPv6 relay is necessary and whether in fact connectivity is achievable through such a relay.

For that purpose according to the invention ICE is extended to make use of a TURN relay for the purpose of IPv4/IPv6 translation, whereby when gathering candidates, an IPv6 only endpoint also gathers an IPv4 candidate from a TURN relay.

This is prioritised along with other candidates, and according to normal ICE practice candidates involving a relay are low priority. Beneficially according to the invention during testing of candidate pairs, if no direct connectivity is found but connectivity is achieved through a TURN relay offering IPv4-IPv6 translation, this media path is selected for the duration of the session and the relay provides translation between IPv4 and IPv6 or the medium concerned.

Thereby the main advantages of the invention are warranted, which lies in using ICE to automatically bring in a media relay to achieve IPv4-IPv6 translation without any involvement of an intermediary on the signalling path, whereby advantageously, the relay is used only if necessary and sufficient to achieve connectivity between the incompatible endpoints.

BRIEF DESCRIPTION OF THE DRAWINGS

Further advantages and details of the invention will be described on ground of a preferred embodiment shown in the sole FIGURE.

The FIGURE shows a schematic view of a preferred embodiment of the invention based on a communication scenario.

DETAILED DESCRIPTION OF INVENTION

It can be seen that as a first part of the scenario a first endpoint C1 is drawn, which only supports the Internet Protocol Version 6 "IPv6".

According to the scenario the first endpoint C1 calls a second endpoint C2, which is not capable of IPv6 but only supports Internet Protocol Version 4 "IPv4" data-packets.

It can be further seen that signalling for establishment of the call is done in accordance with the Session Initiation Protocol "SIP" and that SIP signalling is transmitted between C1 and C2 via a first proxy SIP_PROXY_P1 and a second proxy SIP_PROXY_P2 along the path denoted by SIP1 . . . SIP3. If such signalling leads to successful call establishment, a media path MEDIA_PATH is established for the duration of that call or session. In this example only a single medium (e.g., audio) is used resulting in a single MEDIA_PATH, but multiple media are possible.

In such a scenario according to the exemplary implementation of the invention in a first step S1 the calling endpoint C1 gets an IPv4 address and a port on a Traversal using Relay NAT (Network Address Translator) "TURN"-relay TURN_RELAY as a candidate.

Thereafter as a second step S2 the calling endpoint C1 sends its candidates (as a minimum its own IPv6 address and the IPv4 address obtained from TURN_RELAY) as an offer according to the Session Description Protocol "SDP" as part of a message according to SIP, e.g. the "INVITE request" message, to the called endpoint C2 via the signalling path SIP1 . . . SIP3.

After receiving the SIP message as a third step S3 the called endpoint C2 returns its candidates (as a minimum its own IPv4 address) to the calling endpoint C1 via the signalling path SIP1 . . . SIP3 as an answer according to SDP as part of a message according to SIP, e.g. the "18x response". At this point both endpoints—the first station C1 and the second station C2—are in possession of each other's candidates and can form a list of candidate pairs. In forming this list the stations (endpoints) C1; C2 will eliminate incompatible candidate pairs, including pairs in which one address is IPv4 and the other is IPv6. Thus the list will be reduced in this example to a single candidate pair comprising the IPv4 address and port on TURN_RELAY obtained by the first station C1 and second station's C2 own IPv4 address and port, but in principle additional candidate pairs can remain in the list. Each candidate pair represents a potential media path MEDIA_PATH.

As a result of this exchange as part of a fourth step S4 the stations C1; C2 conduct connectivity tests via the media path MEDIA_PATH utilizing the TURN_RELAY and via any other potential media paths MEDIA_PATH between the stations C1; C2 until a working MEDIA_PATH is found. In this example the media path MEDIA_PATH via the TURN_RELAY is found to work and that candidate pair of IPv4 addresses and ports is therefore adopted for use during the call.

Finally as a fifth step S5 according to the invention a media is transmitted between the IPv6 based first endpoint C1 and the IPv4 based second endpoint C2 by means of the IPv6-IPv4 TURN relay TURN_RELAY using the adopted candidate addresses and ports.

The invention is not limited to the embodiments described above, but rather covers all variations of the core idea—automatically bringing in a media relay to achieve IPv4-IPv6 translation without any involvement of an intermediary on the signalling path, whereby advantageously, the relay is used only if necessary and sufficient to achieve connectivity between the incompatible endpoints—a person with ordinary skills in the art would take into account to implement parts of the steps respectively all method steps according to the invention.

E.g. according to one embodiment of the invention not shown in the FIGURE a call may require multiple media and the same procedures according to the invention are performed for each medium, resulting in the use of one TURN relay for IPv4/Ipv6 translation per medium.

According to another embodiment not shown the called station rather than the calling station seeks an alternative address from a TURN relay. Thus there is only one candidate in the SDP offer but two in the SDP answer. The final result will be the same.

Another embodiment that goes beyond that what is drawn is given, when both the calling station and the called station obtain alternative addresses from their respective local TURN servers (TURN relays). Thus there will be two candidates in the offer and two in the answer and two valid candidate pairs. The first candidate pair for which the test succeeds would be used for media transmission.

The invention claimed is:

1. A method for establishing a multi-media connection in a communications system based on packet oriented communication, comprising:
   providing a first station only supporting IPv6 data-packets;
   providing a second station only supporting IPv4 data-packets;
   providing a media relay station; and
   establishing a communication between the first station and the second station at least partially via the media relay station;
   wherein the media relay station translates IPv4 data-packets into IPv6 data-packets and vice versa;
   wherein the media relay station functions as a traversal using relay network address translator (TURN) relay station; and
   wherein when the first station is calling the second station or the second station is calling the first station, the method further comprising:
      supplying an IP address and port of the calling station as a first candidate for communication, the supplying being done via the calling station;
      retrieving at least one IP address and port by the calling station from the TURN relay station as a second candidate;
      supplying an IP address and port of the called station as a third candidate for communication, the supplying being done via the called station;
      testing in such a manner that for each pair of candidates comprising one of the candidates supplied by the calling station and one of the candidates supplied by the called station using the same IP protocol it is analyzed whether connectivity is achieved; and
      establishing a multi-media communication between the first station and the second station via the TURN relay station using the adopted addresses and ports when the test results show that connectivity is achieved between the calling station and the called station using the address and port supplied by the TURN relay station and submitted as the first candidate or the second candidate by the calling station and the address and port submitted as the third candidate by the called station.

2. The method according to claim 1, wherein the retrieving at least one IP address and port by the calling station from the TURN relay station as a second candidate includes:
   an IPv4 address and port known by the TURN relay station when the calling station is the first station, and
   an IPv6 address and port known by the TURN relay station when the calling station is the second station.

3. The method according to claim 2, wherein the calling station sends a SIP INVITE request message to the called station, the SIP INVITE request message includes an offer according to SDP Protocol and includes at least the first and second candidates.

4. The method according to claim 3, wherein the message is transmitted via at least one station comprising the functionality of a proxy.

5. The method according to claim 4, wherein the called station returns a SIP 18x response message to the first calling station, the message includes an answer according to SDP Protocol and includes at least a first candidate.

6. The method according to claim 5, wherein the messages are transmitted via at least one station comprising the functionality of a proxy.

7. The method according to claim 1, wherein testing is conducted by the first station and by the second station.

8. A media relay for establishing a multi-media connection in a communications system based on packet oriented communication with a first station only supporting IPv6 data-packets, a second station only supporting IPv4 data-packets and a media relay station, comprising:
- a receiver for receiving data;
- a sender for sending data;
- a translator that translates data received as IPv4 based data to IPv6 based data and translates data received as IPv6 based data to IPv4 based data,
- wherein the sender sends a IPv4 address and port to a first station after a request is received from the first station, wherein the sender sends a IPv6 address and port to a second station after a request is received from the second station,
- wherein a communication between the first station and the second station is established via the media relay station, and
- wherein the translator translates data between the first and second stations for the connection.

* * * * *